Sept. 30, 1930.  R. B. C. NOORDUYN  1,776,926
UNDERCARRIAGE FOR AIRCRAFT
Filed Sept. 10, 1925    3 Sheets-Sheet 1
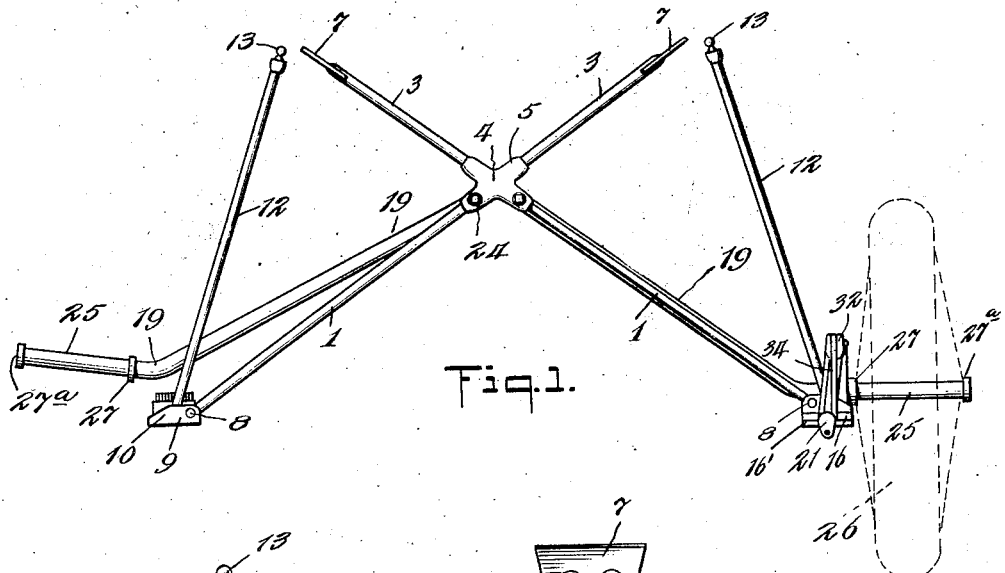
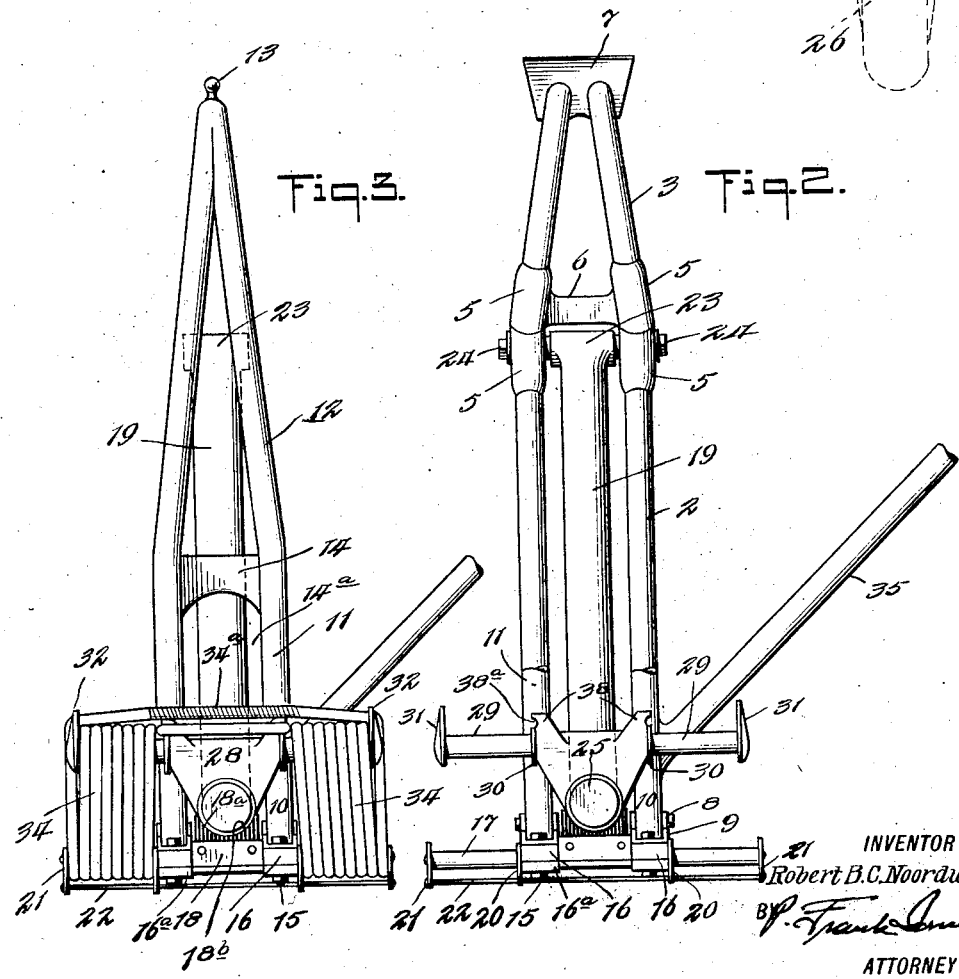
INVENTOR
Robert B.C. Noorduyn
ATTORNEY Sept. 30, 1930. R. B. C. NOORDUYN 1,776,926
UNDERCARRIAGE FOR AIRCRAFT
Filed Sept. 10, 1925 3 Sheets-Sheet 2

INVENTOR
Robert B.C.Noorduyn
ATTORNEY

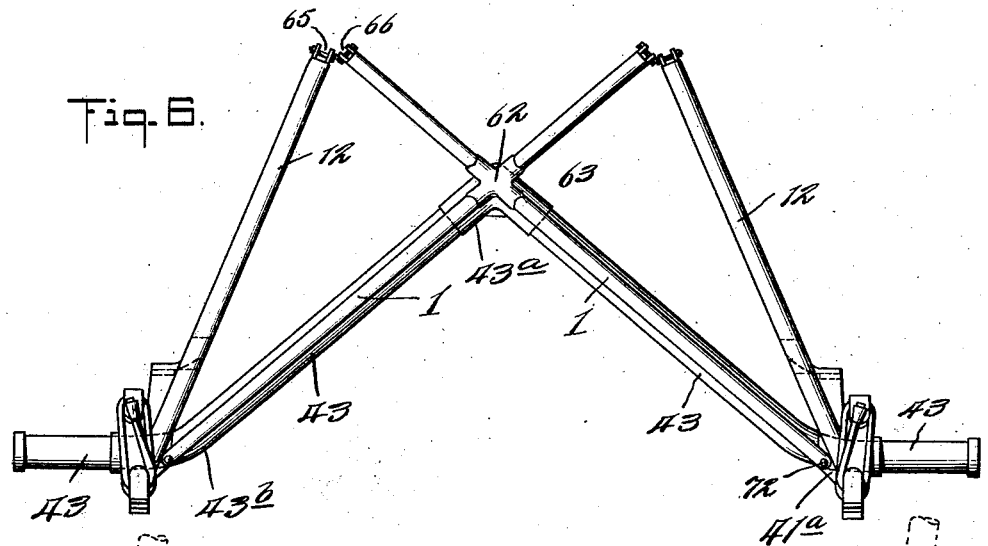
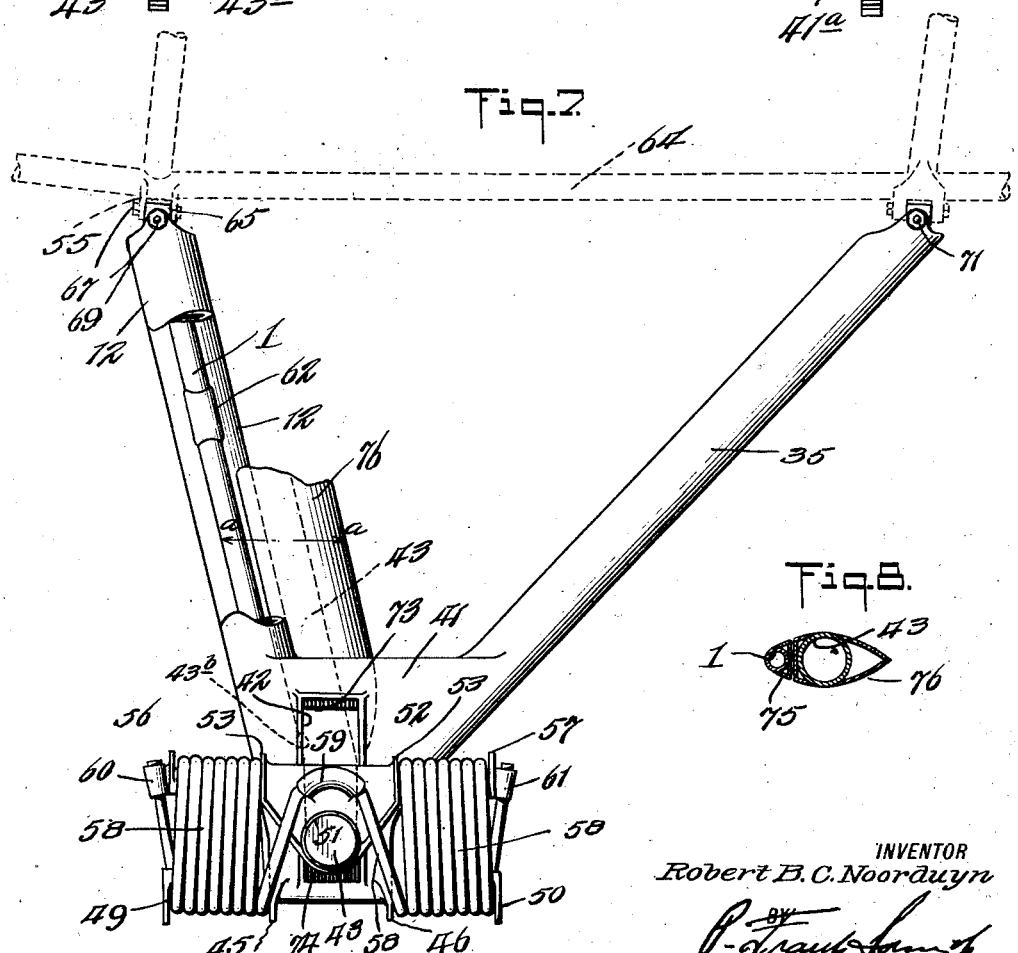
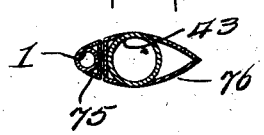

Patented Sept. 30, 1930

1,776,926

UNITED STATES PATENT OFFICE

ROBERT B. C. NOORDUYN, OF HASBROUCK HEIGHTS, NEW JERSEY, ASSIGNOR, BY MESNE ASSIGNMENTS, TO GENERAL AVIATION CORPORATION, OF NEW YORK, N. Y., A CORPORATION OF DELAWARE

UNDERCARRIAGE FOR AIRCRAFT

Application filed September 10, 1925. Serial No. 55,454.

The present invention relates generally to aircraft of the heavier than air type, and is more especially directed to improvements in the so-called landing gears or undercarriages therefor, by means of which the airplanes are supported when at rest upon the ground or when traversing the same in taking off or alighting.

As is well known, the undercarriage structure is subjected to more or less severe strains and stresses when a landing is made, which, under present methods of construction, are communicated in a major degree to the fuselage, to which the struts and stays of the undercarriage are directly connected.

In substantially all instances, the undercarriages are specially designed for each type of airplane, so that it is impossible to substitute one form of undercarriage for another in an airplane of a particular model, without considerable alteration or additions to the structure of the fuselage of the airplane to suit the particular type of landing gear which it is desired to apply.

It is an object of my invention to provide an undercarriage or landing gear for airplanes and the like, which is of a simplified and strong construction and which embodies characteristics of application to render it readily attachable to various existing models of airplanes in substitution for those specifically designed therefor. without alteration to the fuselage or to the undercarriage mountings or cooperating fastening elements, more especially where the raised or the divided axle type of gear is to be substituted for the straight horizontal axle type.

More specifically, my invention comprehends a novel and yet simplified form of supporting means embodying diagonally disposed compression and tension members from which an axle is floatingly supported for reciprocal movement only, the axle being positively maintained in a position to eliminate fore and aft movement at the ends thereof and the resultant strains and stresses imposed upon the cooperating parts, together with reinforcing elements, the whole providing a light weight landing gear or undercarriage of much greater stability and efficiency than those of the present forms.

Further, my invention provides a landing gear consisting of diagonally disposed bracing members adapted for supporting an axle, which may be composed of separate members, and guideways therefor, the said bracing members being fastened at their lower ends to the main struts through which the weight of the airplane is transmitted to the axles through interposed shock absorbing or other yieldable means.

It is also aimed to provide flexible means for limiting the movement of the axle ends with respect to the base of the undercarriage, fore and aft movement being restricted, and guiding the lower ends in slots or guideways associated with the main supporting members or struts.

My invention also contemplates either a single or so-called continuous axle member or an axle formed of a plurality of independently movable sections having a floating connection with the main struts or with the bracing members, or both, the ends of the axles being vertically movable within guideways at or adjacent to the point of jointure of the struts and bracing members.

Other objects and advantages flowing from the practicing of my invention, will become apparent as the description proceeds, and I would have it understood that I reserve unto myself all rights to the full range of equivalents, both in structure and in use, to which I may be entitled under my invention in its broadest aspect.

For the purposes of this disclosure, I have elected to illustrate and describe certain preferred embodiments of my invention, it being evident that in attaining the objects to which my invention is directed, the structure may take other forms without departing from the spirit and scope thereof, as defined by the appended claims.

In the drawings:

Figure 1 is a front elevation of an undercarriage or landing gear, embodying a plurality of axle members; associated with bifurcated bracing members and struts;

Figure 2 is a side elevation of the structure of Figure 1, with the supporting strut broken away and the shock absorber omitted, for the sake of clearness;

Figure 3 is a view similar to Figure 2, taken from the right of Figure 1, with the landing wheel omitted;

Figure 6 is a front elevation of a further modification of my invention in which single members constitute each of the struts and braces, the axle being of the so-called continuous type;

Figure 7 is a side elevation of the structure shown in Figure 6, taken from the left, the main strut being broken away, to clearly show the normal relative positions of the bracing members and axle, and Figure 8 is a cross-section on the line a—a of Figure 7.

Figure 4:
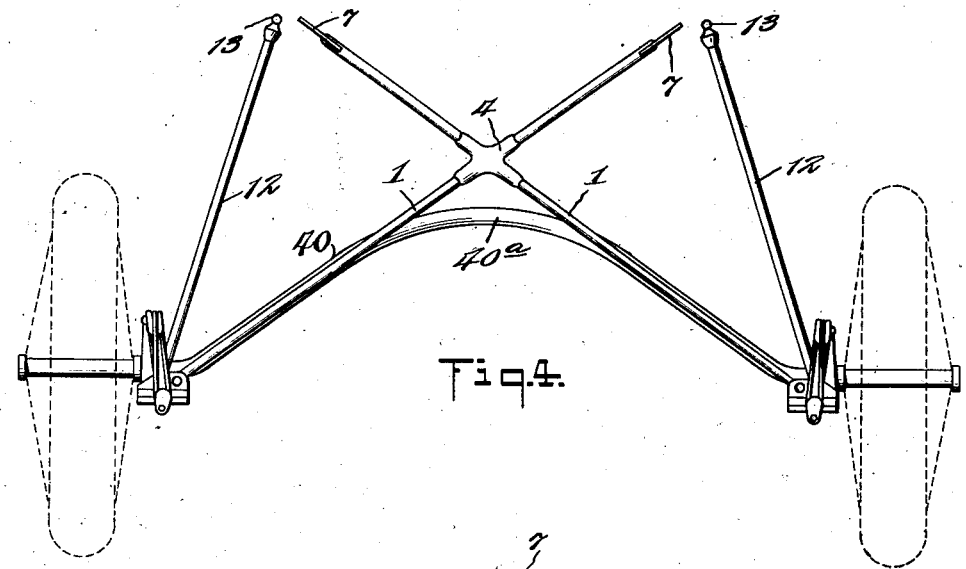
Figure 4 is a front elevation of a landing gear of the general type shown in the preceding figures in which the axle is a single or continuous member.

Referring now to the drawings in detail, in which like characters of reference are employed to designate similar parts in the several views, and more particularly to the structure shown in Figures 1 to 3 inclusive, 1 indicates the diagonally disposed bracing and supporting members, each of which is of a bifurcated construction and is preferably formed of steel tubing.

Each of the aforesaid bracing members or axle frames embodies an upper section 3 and a lower section 2, the side members of the former converging upwardly, while the members of the latter are parallel. Jointure of the members of the upper and lower sections of the frames is effected through the medium of a substantially curciform unit which embodies a web 6 connecting the spaced heads 4 having integral sockets or sleeve 5 within which the registering ends of the members of the upper and lower sections of the respective braces or frames may be permanently fixed, as by welding.

Obviously, this unit may be a casting or drop forging, or may be built up of welded or otherwise united parts. For example, two plates 4 may be connected by a bracket 6, the aforesaid sockets or sleeve 5 being joined to the respective plates in functioning position.

As herein indicated, the diagonal braces or frame members are attachable to the base of the fuselage by means of the plate 7, which is rigidly fixed to the ends of the members of the upper sections 3, of the bracing.

The lower ends of the aforesaid diagonal braces or axle supporting frames 1 are fastened by means of the bolts 8 to brackets or shoes 9. These brackets or shoes 9 are preferably in the form of extensions 10 of the side members 11 of the bifurcated struts 12, which also serve as axle guides, and extend upwardly at an angle, as shown in Figure 1. These struts 12, are adapted to be fastened to the bottom of the fuselage by means of a ball 13, cooperating with a socket (not shown) in the fuselage underbody. This particular means for fastening these struts to the fuselage, is but one of the various methods by which this step may be accomplished according to the invention. For the purpose of strengthening and preventing spreading of the strut members, I provide a bridge or bracket 14 which is preferably welded to the opposite or parallel members near the upper ends thereof. The base of each of the shoes or brackets 9 is apertured adjacent to its ends to receive the bolts 15, by means of which a plurality of clamping members 16 and 16$^a$ may be supported therefrom, the opposed faces of these clamping members being provided with complemental recesses for the reception of a shaft or rod 17, the purpose of which will be later described.

Located between the side members 11 and supported from the upper clamping member 16, with which it may be integral, is a block 18 forming a retainer or bed for a block 18$^a$ of fibrous or flexible material, which is provided with a semi-annular recess or groove 18$^b$ forming a bearing in which the axle 19 normally rests, when no tension forces or compression forces are acting thereon.

The shaft 17, it will be noted, extends outwardly in a fore and aft direction from the strut 12, and has thereon a plurality of spaced flanges or disc-like members 20 and 21, through which flanges there is passed a rod 22, the purpose of which will be described later.

The axle units 19, are preferably bent tubular sections, the upper ends of which are formed with bearing portions 23 which are pivoted within the diagonal bracing members or axle frames 1 by means of the bolts 24, as clearly shown in Figures 1 and 2. Since each of the axle members is pivotally mounted on the aforesaid diagonal members, it is obvious that the axle may be said to comprise three sections, viz. the two floating parts 19 and a fixed or rigid section, the latter being the cruciform member 4.

The floating sections of the axle are movable in a plane perpendicular to the line of movement of the fuselage and reciprocate within the confines of the bifurcated lower sections 2 of the bracing or supporting frames, the free ends of the axle sections being bent to form the usual spindles 25 on which a landing gear wheel 26 of any suitable type, or other landing appendage, may be mounted, and maintained in position by the flange or collar 27 and the cooperating securing nut 27$^a$.

Supported upon the axle 19, adjacent the flange 27, there is a preferably V-shaped block 28, having a groove formed in the upper edge thereof, wherein a shaft 29 may be positioned. This shaft, like shaft 17, has inner and outer flanges or disc-like members 30 and 31, the outer flanges being slotted as at 32. As will be seen, the block 28 is provided with upstanding ears 38 at the ends of its upper edge, which are notched at 38ª, the lower end thereof embodying a bearing for the axle 19.

As previously stated, the block 28 is supported upon the axle member 19 and is movable therewith, as the latter reciprocates in a plane perpendicular to the fuselage. Being supported between the members of the bifurcated diagonal braces or frames 1, the axle will not be affected by any fore and aft thrust, since the aforesaid members form a bearing surface against which the upper end of the axle, pivoted therewithin may bear. Also, it will be noted that the axle member 19 is further limited to movement in one plane by being movable in conjunction with the block 28 within the guideway 14ª between the members 11 of the bifurcated strut 12.

To yieldingly restrain or retard the reciprocatory movement of the axle 19 within the guideways formed by the diagonal braces or frames 1 and the struts 12, I employ preferably rubber cord of the character generally used in landing gear construction, although other means of attaining the desired end may be followed. In the present showing, the rubber cord indicated at 34 of the proper length, is looped within the notches 38ª and the ears 38, the free ends, which are now substantially equal in length, being alternately passed about or wound in opposite directions upon the shafts 29 and 17, until the desired number of windings or loops have been formed, after which they are positioned within the slots 32 of the flanges 31 and brought together for fastening in any suitable manner, as shown at 34ª. Of course, other methods of winding the elastic cord upon the cooperating parts may be followed; also, the method of securing the ends may be changed.

From the foregoing, it will be clear that as the wheels 26 strike the ground, the axle is urged upwardly, carrying with it the blocks 28 and the shafts 29. However, the elastic cord 24 coiled or wound about the shafts 29 and the shafts 17 limits the movement of the former relative to the latter, and coincidently the movement of the axle sections, so that a shock absorbing medium is provided, which is highly efficient in dissipating the injurious forces which would otherwise be transmitted to the fuselage.

It is to be understood that the axle members, as shown in Figures 1 to 3 inclusive, are independent of one another, and as a result thereof, provide a yieldable landing gear; that is, the movement of the axle section on one side of the structure may be more or less pronounced than that on the other side, due to undulations or obstructions in the terrain where a landing is being made. Since each of the pivoted axle sections is independent of the other, but cooperated with the rigid diagonal braces or frames, for movement in one plane only, that is perpendicular to the path of movement of the craft in landing, the thrust strains imparted to the fuselage from the landing gear will be but in one direction. In this way, it can readily be seen that any fore and aft movement of the axle members, tending to produce disruptive strains in the fuselage, upon an abrupt or rough landing, will be entirely eliminated.

The diagonal cross members 1 and the guide struts 12, two of which cooperate to maintain each wheel 26, or other landing appendage, for movement in one plane, provides a definite means of eliminating any fore and aft movement of the axle, while at the same time serving as compression and tension members of the landing gear. The usual rear struts 35 are attached to the main struts 12 and extend upwardly to the fuselage, to complete the fore and aft bracing of the landing gear.

The plates 7 to which the respective diagonally disposed frames or braces 1 are fixed, are designed to be located at that portion of the underbody of the fuselage which by reason of its structure, is the best adapted to receive the thrusts transmitted substantially in a straight line, without detrimental effects, the plates being bolted to the longérons or projections fastened to the longérons and cooperating transverse struts. This method of attachment, combined with the usual ball and socket connection for the struts 12, provides an undercarriage which may be applied to the fuselage structures of all models, with the resulting advantages hereinbefore set forth.

As previously stated, the invention is not limited to an axle consisting of pivotally mounted sections, such as shown in Figures 1 to 3 inclusive, since it is well within the province of the invention to provide an inverted U-shaped or V-shaped axle, which may be floatably mounted between the members forming the diagonal bracing.

Figure 5:
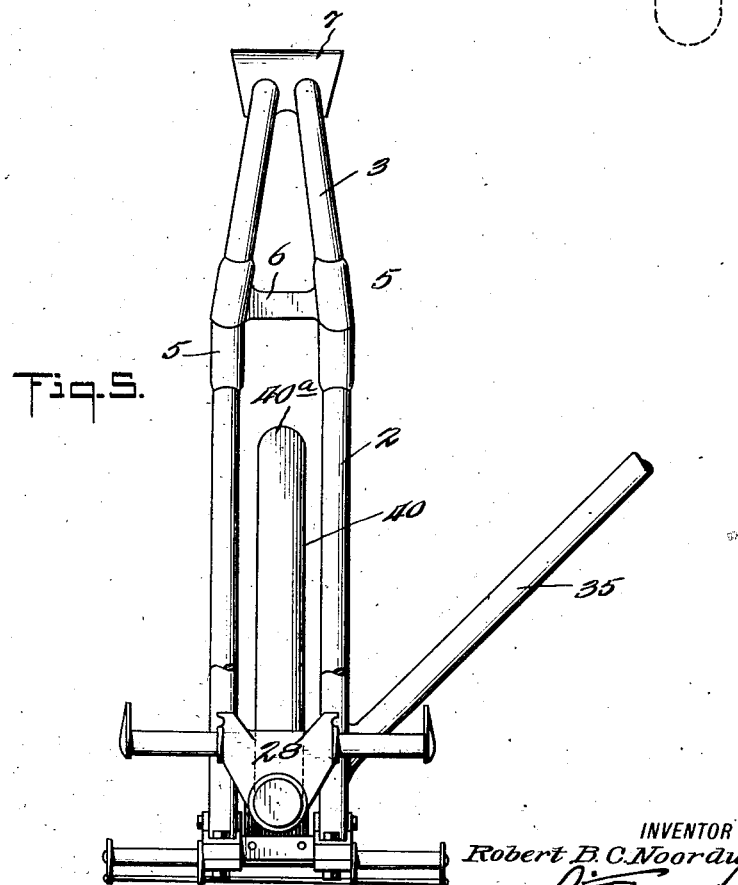
Figure 5 is a side elevation of the modified structure shown in Figure 4.

In the modification shown in Figures 4 and 5, the structure is similar to that illustrated in the preceding figures, except that in lieu of a sectional axle, I provide a one piece or so-called continuous axle 40 which is preferably of metal tubing. The body portion of this axle, which has a bend 40ª intermediate its ends, is located within the bifurcations of the bracing members 1, but is not connected thereto as are the axle sections in Figures 1 to 3 inclusive. The ends of the axle 40, like those of the previously described embodiment, ride within the guideways in the struts 12, their movement being limited to the vertical under the control of the shock absorbers. The body portion of the axle, floating within the bifurcations of the braces is also restrained thereby from fore and aft movement, it being obvious that as in the sectional axle structure, the movement of one end of the axle 40 may be more pronounced or greater than that of the other. The axle 40, as previously stated, may be continuous and of the so-called U-shape or, V-shape, or it may be formed of sections integrally united as by welding, in which event the bend 40ª is preferably provided in a cast or forged union, within the sleeves or sockets of which the ends of the tubing forming the axle may be secured.

In the embodiment of my invention illustrated in Figures 6 to 8 inclusive, the main supporting struts 12 and the rear struts 35 are of the conventional tubular stream line design, the portions thereof adjacent their lower ends, being connected by a bridge 41 which may be of any suitable configuration; these end portions of the struts and the bridge being shaped for jointure by welding or otherwise, to provide a unitary structure of great strength and rigidity.

The intermediate portion of the bridge 41, it will be observed, is extruded and provided with an elongated rectangular slot or opening to form a guideway 42 within which the protruding end of the axle 43 rides, its movement being limited thereby to reciprocation in a vertical plane. Preferably formed integral with the bridge 41, at its lower end, is an outwardly directed toe or extension 44 provided with dependent ears 45 and 46 and laterally disposed arms having plates 49 and 50 at their extremities.

Supported upon the axle 43, through the medium of the annular bearing 51 provided therein, is a substantially V-shaped block 52, flanged as indicated at 53, and provided with lateral extensions or arms carrying plates or flanges 56 and 57 at their outer ends.

As in the other embodiments of my invention, the movement of the axle 43 within the confines of the guideway 42, as described is yieldably restrained or retarded by the employment of rubber or elastic cord 58, which is wound or wrapped about the arms or extensions of the bridge toe 44 and the V-shaped block 52 between the cooperating retaining elements in the customary manner. It twill be noted, however, that in the present application of the cord, the central portion is held or seated within the grooved arcuate lug 59 provided on the V-shaped block 52, while the ends are fixed within the sockets or lugs 60 and 61 secured to the plates or flanges 56 and 57 respectively.

The bracing members 1, which are preferably steel tubing, are connected intermediate of their ends by the cruciform member 62, within the sockets 63 of which the two sections constituting the upper and lower portions of each bracing member are welded or otherwise permanently secured. These bracing members and the main supporting struts, between which they are positioned, are attached to the fuselage at that point, which, by reason of its structure is best adapted to withstand such shocks as may be transmitted thereto through the landing gear, by a ball and socket connection or one that is capable of so-called semi-universal movement. A fitting of the latter type shown herein embodies a bracket or hanger 55 welded or otherwise fixed to the longéron 64 at a strut station, to which the angularly disposed bearing surfaces 65 and 66 are pivotally connected as by bolts 67, the ends of the bracing members 1 and the struts 12 being hinged to their respective supports by bolts as at 69, which are located in planes transverse to the planes of the bolts 67 and 68. The rear struts 35 are similarly connected at their upper ends to the longérons 64, as generally indicated at 71.

The lower ends of the bracing members are bolted to the extension 41ª of the bridge 41 as shown at 72 in front of the axle 43 which is of the inverted V or raised type. The axle, which is formed of steel tubing, may comprise two sections which are integrally joined to the union 43ª forming the bend, or it may be of a continuous piece of stock, the portions adjacent the bends forming the laterally extending ends which ride within the guideways 42, being forwardly offset, as indicated at 43ᵇ, to clear the lower ends of the diagonal bracing members. This offset is rendered necessary owing to the location of the guideways 42 adjacent to the center line of the main struts and the bracing members, it being clearly apparent from Figure 7 that when the axle is in its normal position of rest, the said offset will assume a substantially vertical position, while the portion thereabove will be obliquely disposed behind and parallel to the bracing members.

From the foregoing, it will be manifest that when the landing appendages (not shown) which may be wheels, skids or other devices affixed to the axle ends, strike or make contact with the ground, the thrust will be transmitted in a substantially direct line along the main struts and the bracing members to the fuselage. As the axle is urged upwardly in opposition to the yieldable resistance of the elastic cord attached to the fixed bridge toe and the relatively movable V-shaped block supported from the axle, any tendency to fore and aft movement will be effectually prevented by the opposite surfaces of the guideways with which the axle ends are in peripheral contact. As in the previously described structures, the movement of the axle may be more pronounced or greater at one end than at the other, within the limits of the guideways, at the upper and lower ends of which are provided bumpers or impact blocks 73 and 74, preferably of resilient material, the latter being recessed to form bearing surfaces conforming to the contour of the axle bearing ends of the V-shaped blocks 52.

With the axle floatably mounted as described, it will be obvious that as the landing appendages strike the ground and the axle is urged upwardly, certain rotative forces will be created which will tend to cause the body portion of the axle to move forwardly in an arcuate path, which if not resisted, would seriously impair the efficiency of the structure, if it did not result in its destruction. Therefore, the axle is located behind the bracing members as previously pointed out, the latter serving to limit or restrict forward movement of the former, it being obvious that any movement of the axle body in the reverse or an aft direction will have no detrimental effect upon the structure.

A suitable fairing for each bracing member 1 and the parallel axle portion is provided, this fairing consisting of two longitudinal sections, the leading section 75 being disposed longitudinally of the bracing member, while the trailing section 76 is positioned similarly of the axle body. When the axle is in its normal position relative to the bracing members, the sectional fairing will be of the efficiency of an unbroken structure, the slight spacing of the alined opposed edges of the sections having no effect upon its perfect functioning.

Further changes and modifications may be made in the details of construction shown in the embodiments illustrated to meet particular production or other requirements, without departing from the general spirit of the invention, as set forth in the annexed claims.

I claim:

1. In an airplane landing gear the combination of diagonally disposed supporting struts adapted to hinged connection to the fuselage, rigid bracing members, each of said members being connected at its lower end to one of said struts and inclined for connection at its upper end to the fuselage adjacent the connection of the other of said struts, an axle having its body portion substantially in the planes of the oppositely disposed diagonal bracing members, axle bearings associated with said struts and means for limiting the movement of said axle to vertical reciprocation.

2. In an airplane landing gear, the combination with a plurality of crossed diagonally disposed and interconnected bifurcated supports, of axle members pivoted to said supports, below the point of jointure of said supports, and guide supports cooperating with said diagonally disposed supports, the axle member being movable in one plane only within the diagonal and guide supports, and being restrained from fore and aft movement.

3. In an airplane landing gear, the combination with a plurality of intersecting diagonally disposed interconnected members, said members being bifurcated, of axle members pivoted between said bifurcated members, below the point of jointure thereof, supporting members connected to said diagonal members and having guideways within which the axle members reciprocate, said axle members being retained against fore and aft movement within the bifurcations of said diagonal members and the guideways of said supporting members.

4. A landing gear for airplanes including interconnected rigid diagonal lateral bifurcated bracing members and a vertically movable axle, said members forming a guide for the vertical movement of said axle and restraining it from fore and aft movement.

5. A landing gear for airplanes including rigid inter-connected crossed lateral bracing members, an axle floatably retained within said members for vertical movement only, supporting elements connected to said bracing members and means for restraining said axle from fore and aft movement.

6. A landing gear for airplanes including rigid crossed bracing members, an axle comprising two sections hinged to said members and supporting elements connected to said bracing members, said axle sections being limited to movement in a direction longitudinally of said supporting elements.

7. A landing gear for airplanes, including bifurcated supporting struts, crossed bifurcated bracing members connected to said struts, an axle having its body portion located in a plane above that of the wheel supporting ends thereof and means for supporting said axle, said means including devices associated with said struts for yieldably controlling the movement of said axle.

8. A landing gear for airplanes comprising main supporting struts, inclined fore and aft bracing struts, diagonally disposed tension and compression members located between said main struts and connected thereto, said members being interconnected, means of connection between said main struts and said fore and aft bracing struts, said means embodying axle guideways, an axle having its ends positioned within said guideways, the body portion of said axle being upset and substantially in alinement with said tension and compression members, and means for yieldably controlling the movement of the axle ends within said guideways.

9. An airplane landing gear, comprising main supporting struts, fore and aft bracing struts, laterally inclined tension and compression members located between said main struts and connected thereto, means of connection between said main struts and said fore and aft struts, said means embodying axle guideways, an axle having horizontally disposed ends positioned within said guideways and formed to receive landing appendages, said ends merging into upwardly directed portions and forming substantially an inverted V and means for yieldably controlling the movement of the axle ends within the guideways, such movement being limited to vertical reciprocation.

10. An undercarriage for airplanes, embodying a pair of at least partially parallel struts connectible to the fuselage of an airplane on each side thereof, each pair of struts being inclined downwardly and outwardly from the fuselage, rigid laterally disposed bracing means for each pair of struts, an axle member disposed between each pair of struts and hinged to said bracing means at its inner end for arcuate movement in a substantially vertical plane, between said struts and their asssociated means said axle member being restrained from movement in a fore and aft direction.

11. An undercarriage for airplanes, including a pair of spaced rigid members connected to each side of the fuselage and extending outwardly and downwardly therefrom, rigid means having spaced portions connected to both pairs of said members adjacent their outer ends to brace said members against lateral forces, two axle members, each having a wheel mounted at its outer end, an axle member being disposed between the spaced rigid members on each side of the fuselage, means including a hinge connection between the said axle member and said rigid means for permitting movement of each of said axle members between the cooperating spaced rigid members and between the spaced portions of their rigid bracing means in a substantially vertical plane, said rigid members and spaced portions of their bracing means confining said axle member against fore and aft movement and means for yieldably controlling the aforesaid movement of each axle member.

12. An undercarriage for airplanes comprising two laterally extending substantially vertically disposed X shape members secured together at a point intermediate the ends of the legs of each, a strut comprising two spaced legs secured to the adjacently disposed lower ends of the two X shape members and extending upwardly, an axle disposed intermediate the corresponding lower legs of the X shape members and between the spaced legs of the strut, a wheel on said axle, and resilient means for positioning said axle with respect to said X shape members and said strut.

ROBERT B. C. NOORDUYN.